(12) United States Patent  
Fujiwara

(10) Patent No.: US 7,584,683 B2  
(45) Date of Patent: Sep. 8, 2009

(54) LEVER-RATIO SWITCHING TYPE BRAKE PEDAL APPARATUS

(75) Inventor: Noboru Fujiwara, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 558 days.

(21) Appl. No.: 11/407,947

(22) Filed: Apr. 21, 2006

(65) Prior Publication Data

US 2007/0221009 A1    Sep. 27, 2007

(30) Foreign Application Priority Data

Mar. 23, 2006    (JP) .............................. 2006-081791

(51) Int. Cl.  
*G05G 1/04* (2006.01)

(52) U.S. Cl. ......................................................... 74/516

(58) Field of Classification Search .................. 74/512, 74/513, 516, 517, 518, 560  
See application file for complete search history.

(56) References Cited

U.S. PATENT DOCUMENTS

| 2,755,891 | A | * | 7/1956 | Levell et al. ................. 188/357 |
| 3,733,966 | A | * | 5/1973 | Brown, Jr. ...................... 91/372 |
| 5,758,547 | A | | 6/1998 | Smale |
| 6,298,746 | B1 | | 10/2001 | Shaw |
| 6,666,105 | B2 | | 12/2003 | Wachi |
| 2006/0230870 | A1 | * | 10/2006 | Fukase ......................... 74/512 |
| 2006/0260429 | A1 | * | 11/2006 | Fukase ......................... 74/516 |

FOREIGN PATENT DOCUMENTS

| JP | 5-185912 | 7/1993 |
| JP | 5-301565 | 11/1993 |
| JP | 10-29510 | 2/1998 |
| JP | 2000-79870 | 3/2000 |
| JP | 2002-347590 | 12/2002 |

* cited by examiner

*Primary Examiner*—Vicky A Johnson  
(74) *Attorney, Agent, or Firm*—Finnegan, Henderson, Farabow, Garrett & Dunner, LLP

(57) ABSTRACT

A brake pedal apparatus including: an operating pedal; and first and second working levers which are pivotable according to respective different lever-ratio characteristics in response to a depressing operation effected on the operating pedal and which are connectable to a pivot member via a clutch member. When a reaction force of an output member does not exceed a switching load, a load reaction lever is held in a reference position whereby the first working lever is connected to the pivot member. When the reaction force exceeds the switching load, the load reaction lever is pivoted to a switching position against a biasing force of a biaser whereby the second working lever is connected to the pivot member.

7 Claims, 9 Drawing Sheets

LEVER-RATIO SWITCHING TYPE BRAKE PEDAL APPARATUS

This application is based on Japanese Patent Application No. 2006-081791, the content of which is incorporated hereinto by reference.

BACKGROUND OF THE INVENTION

1. Field of the Invention

The present invention relates in general to a brake pedal apparatus, and more particularly to an improvement of a lever-ratio switching type brake pedal apparatus in which a characteristic of a lever ratio is changed depending upon a depressing force.

2. Discussion of Prior Art

There is known a brake pedal apparatus having: (a) an operating pedal which is disposed on a support member pivotably about a first axis, and which is to be operatively depressed by an operator; (b) a pivot member which is disposed on the support member pivotably about a second axis parallel to the first axis, and which is mechanically connected to the operating pedal so as to be pivoted about the second axis in response to a depressing operation effected on the operating pedal; and (c) an output member which is to be mechanically pressed or pulled as a result of pivot motion of the pivot member. As an example of such a brake pedal apparatus, Patent Document 1 discloses an apparatus in which the operating pedal and the pivot member are connected to each other through a cam, which provides a high degree of freedom in setting a lever-ratio characteristic. The lever-ratio characteristic is a characteristic of change in a moment-length ratio (lever ratio) in relation with a pedal stroke (depressing amount) of the operating pedal, namely, is a characteristic of change in a lever ratio (corresponding to a ratio of output amplification to a depressing force applied to the operating pedal) in relation with the pedal stroke.

Further, there is proposed a brake pedal apparatus having: (a) an operating pedal which is to be operatively depressed by an operator; (b) a switching lever which is disposed on a support member pivotably about a first axis, and which supports the operating pedal such that the operating pedal is pivotable relative to the switching lever about a second axis parallel to the first axis; (c) a positioning device which mechanically positions the switching lever in a predetermined reference position about the first axis, and which allows the switching lever to be pivoted away from the reference position about the first axis when a reaction force acting on the second axis during the depressing operation effected on the operating pedal exceeds a predetermined switching load; and (d) an engaging member which causes the operating pedal (pivoted about the second axis) to be brought into engagement with the switching lever in a predetermined relative position when the switching lever is pivoted, and which causes the operating pedal to be pivoted integrally with the switching lever about the first axis. As an example of such a brake pedal apparatus, Patent Document 2 discloses an apparatus in which, when the operating pedal is strongly depressed, for example, in the event of failure of a boosting device such as a brake booster, a center of pivot motion of the operating pedal is shifted from the second axis to the first axis, whereby the lever-ratio characteristic is switched to another lever-ratio characteristic. It is therefore possible to increase the ratio of the output to the depressing force and accordingly to generate a further increased braking force, as a result of the shift of the center of the pivot motion from the second axis to the first axis, where a relationship such as a positional relationship between the first and second axes is established such that the lever ratio is increased by the shift of the pivot motion center from the second axis to the first axis. In this arrangement in which the lever-ratio characteristic per se is switched to another lever-ratio characteristic, the lever ratio can be changed more largely than in the arrangement disclosed in the above-described Patent Document 1.

Patent Document 1: JP-H5-185912A
Patent Document 2: JP-2002-347590A

However, in such a conventional lever-ratio switching type brake pedal apparatus having a construction arranged to change the center of pivot motion of the operating pedal that is operatively depressed by an operator, possible errors in dimensions and position of each component of the apparatus are likely to cause variation of a home position of the operating pedal (i.e., an initial position of the operating pedal when it is not operated) and/or provide the operating pedal with play. Thus, for avoiding such a problem, a high degree of dimensional accuracy of the components and a high degree of assembling accuracy of the components are required. Further, in the conventional lever-ratio switching type brake pedal apparatus, the degree of freedom in setting the lever-ratio characteristic is low since the lever ratio is changed by merely changing the center of the pivot motion of the operating pedal.

The present invention was made in the light of the background art discussed above. It is therefore an object of the invention to make it possible, in a brake pedal apparatus in which a lever-ratio characteristic is switched to another depending on a depressing force applied to the operating pedal, to restrain variation of a home position of the operating pedal and play of the operating pedal even in presence of errors in dimensions and position of each component of the apparatus, and to increase the degree of freedom in setting each of the lever-ratio characteristics that are selectively available, for providing a lever ratio that is further suitably variable according to the depressing force.

SUMMARY OF THE INVENTION

For achieving the above object, the first invention provides a lever-ratio switching type brake pedal apparatus having: (a) an operating pedal which is disposed on a support member pivotably about a first axis, and which is to be operatively depressed by an operator; (b) a pivot member which is disposed on the support member pivotably about a second axis parallel to the first axis, and which is mechanically connected to the operating pedal so as to be pivoted about the second axis in response to a depressing operation effected on the operating pedal; and (c) an output member which is to be mechanically pressed or pulled as a result of pivot motion of the pivot member, the brake pedal apparatus being characterized by having: (d) first and second working levers which are disposed on the support member pivotably about the second axis relative to the pivot member; (e) first and second connecting device which mechanically connect the respective first and second working levers to the operating pedal, and which cause the respective first and second working levers to be pivoted about the second axis according to respective different lever-ratio characteristics in response to the depressing operation effected on the operating pedal; (f) a clutch member which is movably disposed on the pivot member, and which is positionable in any one of a first connecting position, a second connecting position and an intermediate position between the first and second connecting positions, the clutch member integrally connecting the first working lever to the pivot member and disconnecting the second working lever from the pivot member while being positioned in the first connecting position, the clutch member integrally connecting the second working lever to the pivot member and disconnecting the first working lever from the pivot member while being positioned in the second connecting position, the clutch member integrally connecting both of the first and second working levers to the pivot member while being positioned in the intermediate connecting position; (g) a load reaction lever which is connected to the output member and is disposed on the pivot member pivotably about a third axis that is parallel to the second axis, the load reaction lever being held in a reference position by a biasing force of a first biaser and being pivoted integrally with the pivot member so as to mechanically press and pull the output member, the load reaction lever being pivoted relative to the pivot member about the third axis to a switching position against the biasing force of the first biaser, when a reaction force of the output member exceeds a predetermined switching load, and being pivoted integrally with the pivot member so as to mechanically press and pull the output member; and (h) a clutch switching mechanism which positions the clutch member in the first connecting position while the load reaction lever is held in the reference position, and which cooperates with the load reaction lever to mechanically move and position the clutch member in the second connecting position when the load reaction lever is relatively pivoted to the switching position.

The second invention is, in the lever-ratio switching type brake pedal apparatus of the first invention, characterized in that: (a) the first and second working levers are disposed on respective opposite sides of the pivot member in a direction of the second axis, the first working lever having a multiplicity of first meshing teeth arranged along a circular arc whose center is at the second axis, the second working lever having a multiplicity of second meshing teeth arranged along a circular arc whose center is at the second axis; (b) the clutch member has a first engaging tooth that is to be engaged with the first meshing teeth, and a second engaging tooth that is to be engaged with the second meshing teeth, the clutch member being pivotably disposed on the pivot member; and (c) the clutch switching mechanism has a second biaser that is disposed to bridge between the clutch member and the load reaction lever or the pivot member, the clutch switching mechanism causing the clutch member to be positioned in the first connecting position by a biasing force of the second biaser and causing the first engaging tooth to be engaged with the first meshing teeth while the load reaction lever is held in the reference position, the clutch switching mechanism causing the clutch member to be pivoted to the second connecting position by engagement of the load reaction lever with the clutch member against the biasing force of the second biaser and causing the second engaging tooth to be engaged with the second meshing teeth when the load reaction lever is relatively pivoted to the switching position.

The third invention is, in the lever-ratio brake pedal apparatus of the first or second invention, characterized in that: (a) the first connecting device is a first connecting link which is relatively pivotably connected to both of the first working lever and the operating pedal, and (b) the second connecting device is a second connecting link which is relatively pivotably connected to both of the second working lever and the operating pedal.

The fourth invention is, in the lever-ratio brake pedal apparatus of any one of the first through third inventions, characterized in that: the first biaser is a spring member which is disposed to bridge between the pivot member and the load reaction lever, and which directly biases the load reaction lever such that the load reaction lever is pivoted about the third axis toward the reference position relative to the pivot member.

The term "directly biasing the load reaction lever such that the load reaction lever is pivoted about the third axis toward the reference position relative to the pivot member" may be interpreted to mean that, when the load reaction lever is relatively pivoted-toward the reference position, a biasing force of the spring member exerted on an engaged portion of the load reaction lever (with which the spring member is engaged) contains a component acting in a direction of movement of the engaged portion, and the load reaction lever is relatively pivoted toward the reference position by that biasing force. Although the direction of the movement of the engaged portion and the direction of the biasing force do not have to accurately coincide with each other, it is preferable that the directions substantially coincide with each other.

In the lever-ratio switching type brake pedal apparatus, in response to the depressing operation effected on the operating pedal, the first and second working levers can be pivoted about the second axis according to respective different lever-ratio characteristics, and can be connected integrally to the pivot member through the clutch member. One of the lever-ratio characteristics is selected depending on which one of the first and second working levers is connected to the pivot member. While the operating pedal is being moderately depressed, namely, while the reaction force of the output member is not larger than the switching load, the load reaction lever is held in the reference position by the biasing force of the first biaser, so that the clutch member is positioned in the first connecting position through the clutch switching mechanism whereby the first working lever is connected to the pivot member. On the other hand, while the operating pedal is being strongly depressed, namely, while the reaction force of the output member exceeds the switching load, the load reaction lever is pivoted to the switching position against the biasing force of the first biaser, so that the clutch member is placed in the second connecting position whereby the second working lever is connected to the pivot member. That is, depending upon whether the operating pedal is depressed strongly or moderately, namely, whether the reaction force exceeds the switching load or not, a path of transmission of the depressing force is changed by the clutch switching mechanism, whereby the selected lever-ratio characteristic is changed. For example, where the lever ratio is set to be higher during the connection of the pivot member with the second working lever than during the connection of the pivot member with the first working lever, the ratio of the output to the depressing force is increased whereby a large braking force can be generated while the operating pedal is strongly depressed.

In the present invention, since the operating pedal is supported by the support member such that the operating pedal is pivotable about a predetermined fixed axis, i.e., the first axis, it is possible to restrain variation of a home position of the operating pedal and play of the operating pedal which could be caused by errors in dimensions and position of each component of the apparatus, as compared with the arrangement disclosed in the above-described Patent Document 2 in which the center of pivot motion of the operating pedal is changed. This feature alleviates the required degrees of dimensional accuracy and assembling accuracy of the components, thereby making it possible to easily and cheaply manufacture the brake pedal apparatus having a predetermined pedal quality.

Further, since the first and second working levers are connected to the operating pedal through the respective first and second connecting devices, the degree of freedom in setting the lever-ratio characteristics of the respective first and second working levers is high. Thus, as compared with the arrangement in which the lever-ratio characteristic is changed by merely changing the center of the pivot motion of the operating pedal, it is possible to provide a lever ratio that is further suitably variable according to the depressing force applied to the operating pedal. Further, since the first and second working levers are disposed to be pivotable about the second axis that is common to the two working levers, the apparatus can be made compact in size, so that there is an advantage that the apparatus can be easily installed on a vehicle.

In the second invention, the first working lever has the multiplicity of first meshing teeth arranged along the circular arc whose center is at the second axis, while the second working lever has the multiplicity of second meshing teeth arranged along the circular arc whose center is at the second axis. When the clutch member which is pivotably disposed on the pivot member is positioned in the first connecting position by the biasing force of the second biaser, the first engaging tooth of the clutch member is engaged with the first meshing teeth. When the clutch member is pivoted, against the biasing force of the second biaser, to the second connecting position by the engagement of the load reaction lever with the clutch member as a result of the pivot motion of the load reaction lever to the switching position, the second engaging tooth of the clutch member is engaged with the second meshing teeth. Thus, one of the lever-ratio characteristics is switched to another of the lever-ratio characteristics.

The clutch member is pivotably disposed on the pivot member, and is positioned in the first connecting position by the biasing force of the second biaser. When the load reaction lever is pivoted to the switching position, the clutch member is pivoted to the second connecting position against the biasing force of the second biaser, whereby the selected lever-ratio characteristic is switched to another lever-ratio characteristic. Therefore, as compared with an arrangement in which the clutch member is arranged to be movable linearly along a straight line parallel to the second axis so as to be positionable in the first and second connecting positions, the apparatus can be simply constructed, and the motion of the clutch member is stabilized, so that the lever-ratio characteristic is reliably switched to another, upon application of a predetermined depressing force to the operating pedal.

In the third invention, the first connecting device is constituted by the first connecting link that is relatively pivotably connected to both of the first working lever and the operating pedal, while the second connecting device is constituted by the second connecting link that is relatively pivotably connected to both of the second working lever and the operating pedal. Therefore, by suitably designing connection positions of the connecting links, each of the lever-ratio characteristics of the respective first and second working levers, i.e., each of the lever-ratio characteristics for the moderate depression and strong depression can be freely set within a wide range.

In the fourth invention, as the first biaser which positions the load reaction lever in the reference position and which allows the load reaction lever to be relatively pivoted to the switching position when the reaction force exceeds the predetermined switching load, there is provided the spring member which directly biases the load reaction lever such that the load reaction lever is pivoted about the third axis toward the reference position relative to the pivot member. In this arrangement, the load reaction lever is moved to the switching position appropriately based on the switching load that is determined univocally depending on the biasing force of the spring member, so that the selected lever-ratio characteristic can be changed reliably with high accuracy. In the above-described Patent Document 2 in which the positioning device is provided to position the switching lever in the reference position by engagement of a ball with a V-shaped groove, the switching lever is held in the reference position owing to friction force acting between the ball and a wall of the V-shaped groove. In this arrangement, the switching load (allowing pivot movement of the switching lever by removal of the ball from the V-shaped groove) is easily changed, for example, by wear of the wall of the V-shaped groove, so that the switching load is difficult to be set reliably with high accuracy.

The first and second connecting devices are constructed such that a lever-ratio characteristic 2 provides a higher lever ratio than a lever-ratio characteristic 1, wherein the lever-ratio characteristic 1 is the lever-ratio characteristic for the moderate depression, i.e., the lever-ratio characteristic provided by the connection of the pivot member with the first working lever, while the lever-ratio characteristic 2 is the lever-ratio characteristic for the strong depression, i.e., the lever-ratio characteristic provided by the connection of the pivot member with the second working lever. However, the first and second connecting devices may be constructed such that the lever-ratio characteristic 2 provides a smaller lever ratio than the lever-ratio characteristic 1, for preventing damage or other undesirable things caused by an excessively large input.

The switching load, which causes the load reaction lever to be pivoted from the reference position to the switching position, is determined such that the load reaction lever is pivoted to the switching position, for example, during a depressing operation effected on the operating pedal whereby the lever-ratio characteristic 1 is switched to the lever-ratio characteristic 2 in process of an ordinary braking performed by the depressing operation. Further, the switching load may be determined to be relative high such that the load reaction lever is held in the reference position during the depressing operation for the ordinary brake whereby the connection of the pivot member with the first working lever is kept so as to maintain the lever-ratio characteristic 1 for the moderate depression throughout the ordinary brake, and such that the load reaction lever is pivoted to the switching position whereby the lever-ratio characteristic 1 is switched to the lever-ratio characteristic 2 when the depressing operation is effected by the operator with a depressing force that is larger than in the ordinary brake, for example, in case of urgent brake (panic brake) or failure of a brake booster rendering a boosting effect unavailable.

Although the first and second connecting devices are preferably provided by the first and second connecting links, for example, as in the third invention, they may be provided by a cam mechanism as disclosed in the above-described Patent Document 1. Further, the connecting devices may be constituted by any one of various arrangements such as an arrangement in which a plurality of levers or connecting links are provided to mechanically connect the operating pedal to the first and second working levers and an arrangement with provision of connecting pins and elongated holes for directly connecting the operating pedal to the first and second working levers while permitting the operating pedal to be pivotable relative to the first and second working levers.

The first biaser for holding the load reaction lever in the reference position is preferably provided by a spring member that is engaged directly with the pivot member and the load reaction lever, for example, as in the fourth invention, wherein a tensile coil spring, a compressive coil spring or a torsion coil spring may be used as the spring member. However, each of the other inventions may be carried out with any one of various arrangements such as an arrangement in which the first biaser is provided by an air spring, a rubber or other elastic body and an arrangement in which an engaged member (ball or the like) biased by the biaser is engaged with a groove to be positioned, as disclosed in the above-described Patent Document 2. It is preferable that, when the operating pedal and the output member are returned to their home positions (original positions) by a return spring or the like as a result of suspension of the depressing operation, the load reaction lever is also returned automatically to the reference position by the biasing force of the first biaser. It is also possible to additionally employ a returning device arranged to return the load reaction lever to the reference position by an electric motor.

The clutch member is pivotably disposed on the pivot member, for example, as in the second invention such that the clutch member is positioned in the first connecting position by the biasing force of the second biaser and such that the clutch member is pivoted to the second connecting position against the biasing force of the second biaser when the load reaction lever is pivoted to the switching position. However, each of the other inventions may be carried out, for example, with an arrangement in which a cylindrical-shaped or semi-cylindrical-shaped clutch member having an inner circumferential surface provided with a multiplicity of engaging teeth or a clutch member having axially opposite end surfaces each provided with engaging teeth arranged along a circular arc whose center is at the second axis is disposed linearly movably along a straight line parallel to the second axis between the first and second connecting positions. In this arrangement, the clutch member is caused by the clutch switching mechanism such as a link mechanism, a cam mechanism and a wedge mechanism, to be linearly moved from one of the first and second connecting positions to the other in response to pivot motion of the load reaction lever.

Although the first and second meshing teeth of the second invention may be arranged in a complete circle around the second axis, the meshing teeth may be arranged only in a part of the circle around the second axis as long as the meshing teeth are connectable with the clutch member. In the second invention, the multiplicity of first and second meshing teeth are arranged around the second axis, namely, are arranged in a radial or cylindrical manner. However, where the cylindrical or semi-cylindrical clutch member is arranged to be linearly movable, the multiplicity of first and second meshing teeth may be replaced with a single first meshing tooth and a single second meshing tooth.

The clutch member of the second invention is, for example, provided by a T-shaped member such that the T-shaped clutch member is pivotably disposed at its vertical bar portion on the pivot member and such that the first and second engaging teeth provided in respective opposite distal ends of a horizontal bar portion of the T-shaped clutch member are engageable with the first and second meshing teeth. Further, the second biaser of the second invention is preferably provided by a spring member such as a tensile coil spring, a compression coil spring or a torsion coil spring. The spring member as the second biaser may be arranged to bridge the clutch member and the load reaction member or bridge the clutch member and the pivot member.

The output member is provided by, for example, by an operating rod of a brake booster that is to be pressed in response to a depressing operation effected on the operating pedal. However, the output member may be provided by a brake cable that is to be pulled in response to the depressing operation. Further, the present invention is applicable also to an electric brake system in which a braking force is-controlled by electrically detecting load applied to the output member and displacement of the output member.

While the brake pedal apparatus of the present invention is advantageously applied to a service brake system, it is applicable also to a parking braking system.

DETAILED DESCRIPTION OF THE INVENTION

There will be described in detail embodiments of the present invention, with reference to the drawings.

Figure 1:
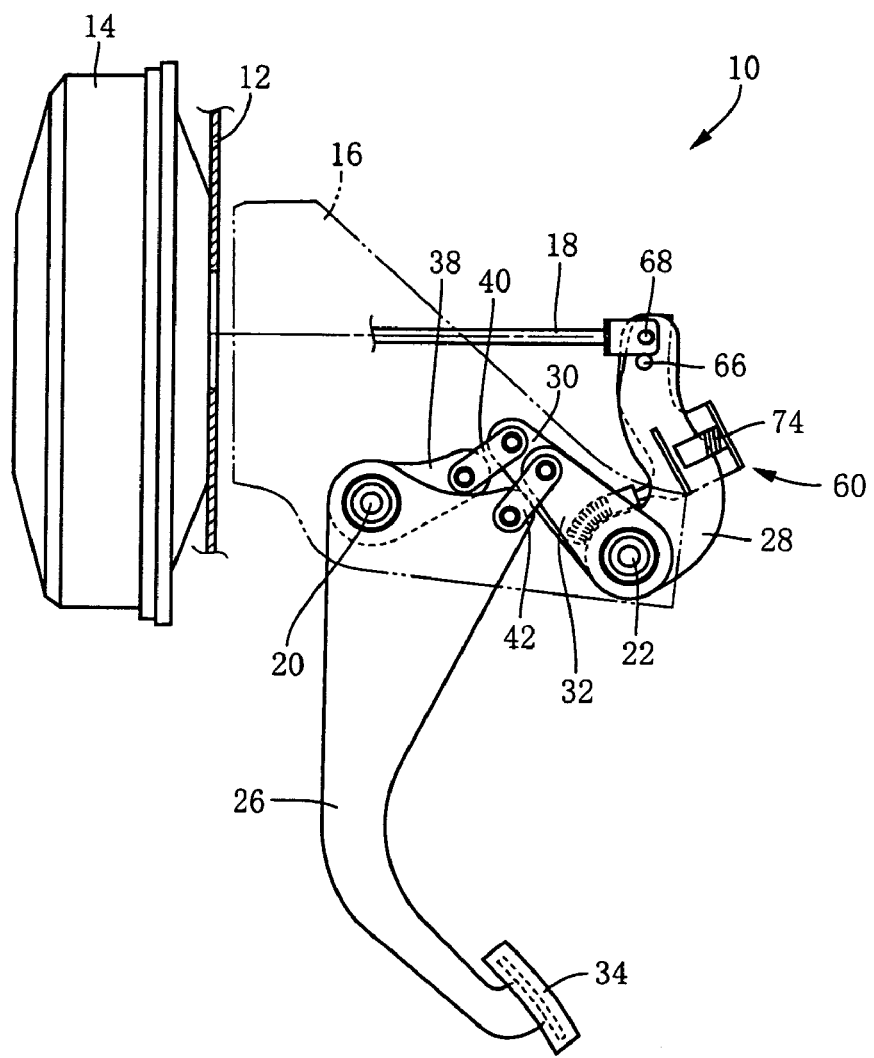
FIG. 1 is a side view showing a lever-ratio switching type brake pedal apparatus according to an embodiment of the present invention.

FIG. 1 is a view for explaining an embodiment of the present invention in the form of a lever-ratio switching type brake pedal apparatus 10 (hereinafter simply referred to as "brake pedal apparatus 10") that is to be used for a service braking system of a vehicle. The view of FIG. 1 is a side view as viewed from a left side of the apparatus 10. This brake pedal apparatus 10 is adapted to be integrally disposed on a dash panel 12 that separates a passenger compartment and an engine room of the vehicle from each other. A brake booster 14 and a pedal bracket 16 are located on respective opposite sides of the dash panel 12, and are fixed integrally to each other. The pedal bracket 16 corresponds to a support member that is fixed integrally to a body of the vehicle. A pedal arm 26 is disposed on the pedal bracket 16 so as to be pivotable about an axis $O_1$ of a first shaft 20 (see FIGS. 2 and 3) that substantially horizontally extends in a width direction of the vehicle. Further, a pivot member 28 is disposed on the pedal bracket 16 so as to be pivotable about an axis $O_2$ of a second shaft 22 (see FIGS. 2 and 3) that is parallel to the first shaft 20. A pedal pad 34 is provided in a lower end portion of the pedal arm 26, so as to be depressed by an operator of the vehicle in a forward direction, i.e., in a leftward direction as seen in FIG. 1. It is noted that each of the first and second shafts 20, 22 per se do not necessarily have to be pivoted about a corresponding one of the axes $O_1$, $O_2$, but may be fixed integrally to the pedal bracket 16.

Figure 2:
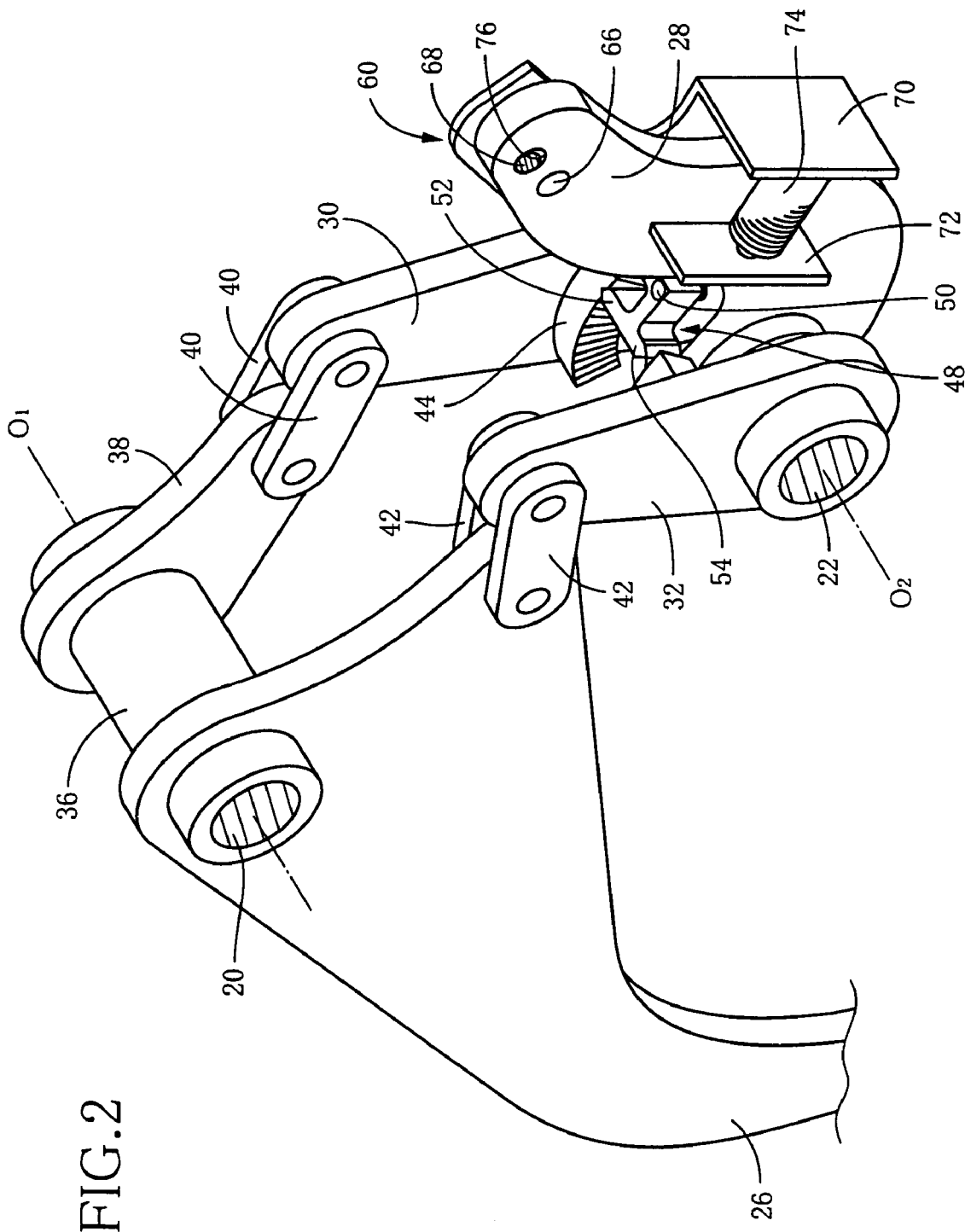
FIG. 2 is a perspective view of a main portion of the lever-ratio switching type brake pedal apparatus of FIG. 1, as viewed from a right upper side of the apparatus in a front side of drawing sheet of FIG. 1.
Figure 3:
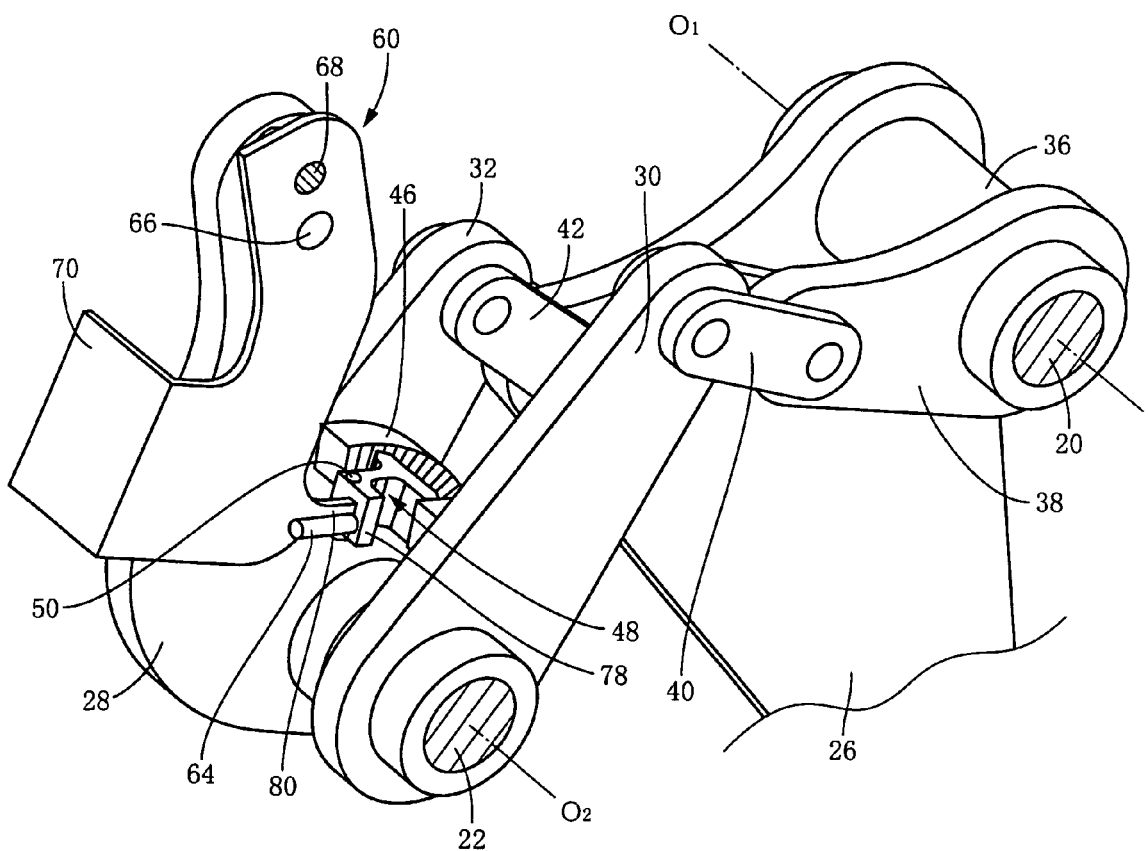
FIG. 3 is a perspective view of the main portion of the lever-ratio switching type brake pedal apparatus of FIG. 1, as viewed from the right upper side of the apparatus in a rear side of drawing sheet of FIG. 1.

FIG. 2 is a perspective view of an upper end portion of the pedal arm 26 and the pivot member 28, as viewed from a right upper side of the apparatus 10 in a front side of drawing sheet of FIG. 1. FIG. 3 is a perspective view as viewed from the right upper side of the apparatus 10 in a rear side of drawing sheet of FIG. 1. As is apparent from the perspective views, first and second working levers 30, 32 are mounted on the second shaft 22 so as to be pivotable about the axis $O_2$ of the second shaft 22 relative to the pivot member 28. The first and second working levers 30, 32 are disposed on respective opposite sides of the pivot member 28 in a direction of the second axis $O_2$. The pedal arm 26 is mounted on the first shaft 20 via a sleeve 36, and is pivotable relative to the first shaft 20. A sub arm 38 is integrally fixed to the sleeve 36, so as to be pivotable integrally with the pedal arm 26 about the first axis $O_1$. In the present embodiment, an operating pedal is constituted by the pedal arm 26 as its main body, the sleeve 36 and the sub arm 38.

A pair of first connecting links 40 is provided to bridge the sub arm 38 and the first working lever 30, and is connected to the sub arm 38 and the first working lever 30 so as to be pivotable about axes parallel to the first and second axes O1, O2 relative to the sub arm 38 and the first working lever 30, so that the first connecting links 40 cause the first working lever 30 to be mechanically pivoted about the second axis $O_2$ according to a predetermined lever-ratio characteristic in response to a depressing operation effected on the pedal arm 26. A lever-ratio characteristic 1 shown in FIGS. 10A-10D is that established where the pivot member 28 is pivoted integrally with the first working lever 30 and presses the operating rod 18 of the brake booster 14. The lever-ratio characteristic 1 is suitably set, as shown in FIGS. 10A-10D, based on projection directions and lengths of the sub arm 38 and first working lever 30 and connected positions of the first connecting links 40. The first connecting links 40 correspond to a first connecting device. In the present embodiment, the first connecting links 40 are disposed on respective opposite sides of each of the first working lever 30 and sub arm 38.

A pair of second connecting links 42 is provided to bridge the pedal arm 26 and the second working lever 32, and is connected to the pedal arm 26 and the second working lever 32 so as to be pivotable about axes parallel to the first and second axes O1, O2 relative to the pedal arm 26 and the second working lever 32, so that the second connecting links 42 cause the second working lever 32 to be mechanically pivoted about the second axis $O_2$ according to a predetermined lever-ratio characteristic in response to the depressing operation effected on the pedal arm 26. A lever-ratio characteristic 2 shown in FIGS. 10A-10D is that established where the pivot member 28 is pivoted integrally with the second working lever 32 and presses the operating rod 18 of the brake booster 14. The lever-ratio characteristic 2 is suitably set, as shown in FIGS. 10A-10D, based on a projection direction and a length of the second working lever 32 and connected positions of the second connecting links 42, so as to be different from the above-described lever-ratio characteristic 1. The second connecting links 42 correspond to a second connecting device. In the present embodiment, the second connecting links 42 are disposed on respective opposite sides of each of the second working lever 32 and pedal arm 26.

It is noted that each of the lever-ratio characteristics 1 and 2 shown in FIGS. 10A-10D is a characteristic of change in a lever ratio (corresponding to a ratio of output to a depressing force applied to the pedal arm 26) in relation with a pedal stroke (depressing amount) of the pedal arm 26, and that each of the lever-ratio characteristics 1 and 2 is merely an example of such a lever-ratio characteristic and does not necessarily correspond to that of the brake pedal apparatus 10 shown in FIGS. 1-3.

Figure 4:
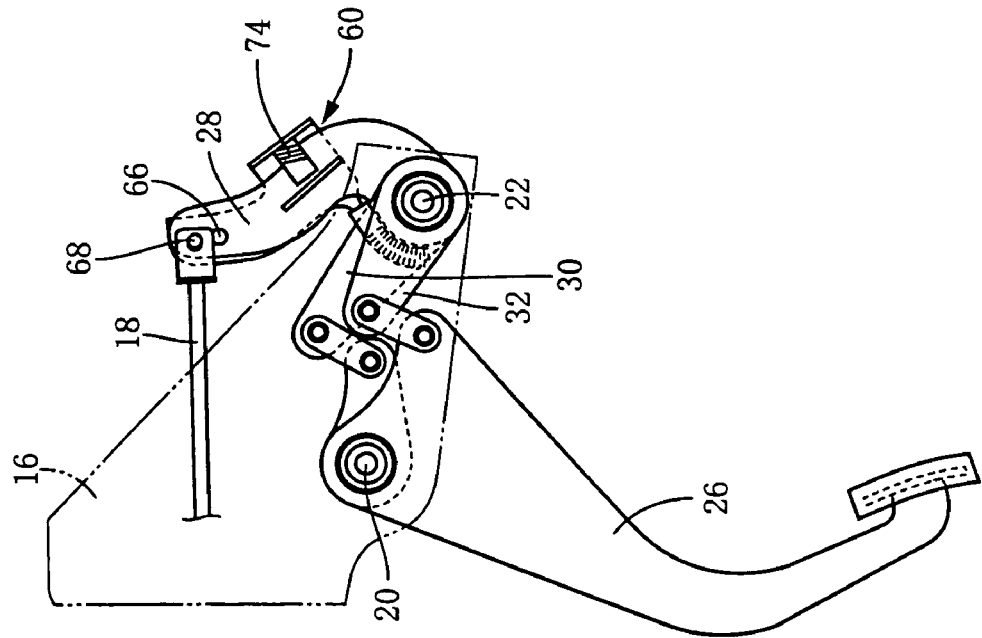
FIG. 4A is a view showing a state of the lever-ratio switching type brake pedal apparatus of FIG. 1 with its operating pedal being operatively depressed, before a lever-ratio characteristic is switched to another lever-ratio characteristic.
FIG. 4B is a view showing a state of the lever-ratio switching type brake pedal apparatus of FIG. 1 with its operating pedal being operatively depressed, after the lever-ratio characteristic is switched to the other lever-ratio characteristic.
Figure 4:
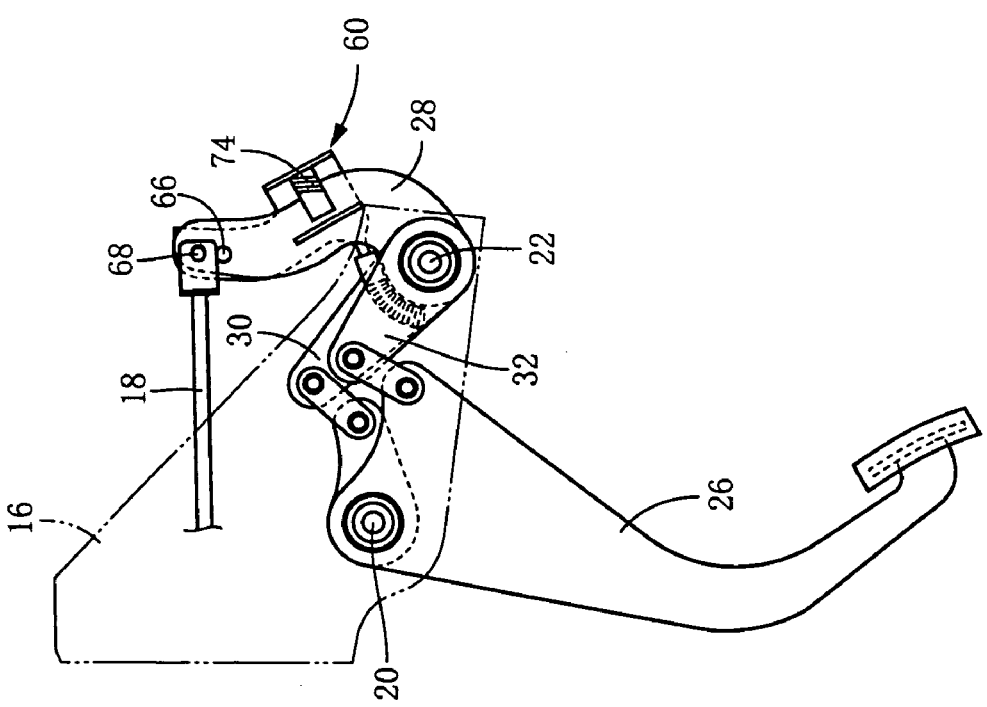
Figure 5:
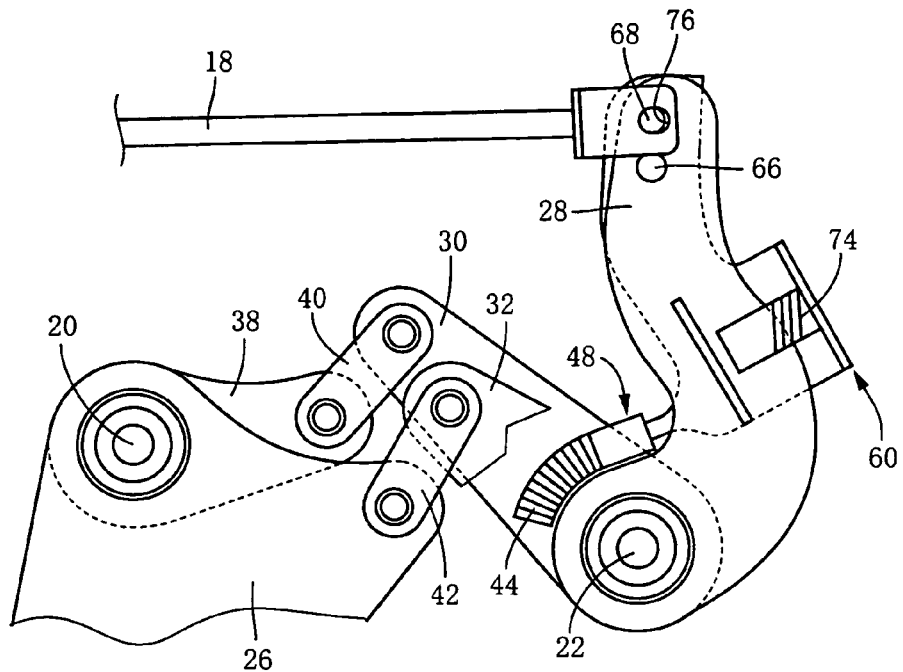
FIG. 5 is a view showing a main portion of FIG. 4A in enlargement with a part of which being cut away.
Figure 6:
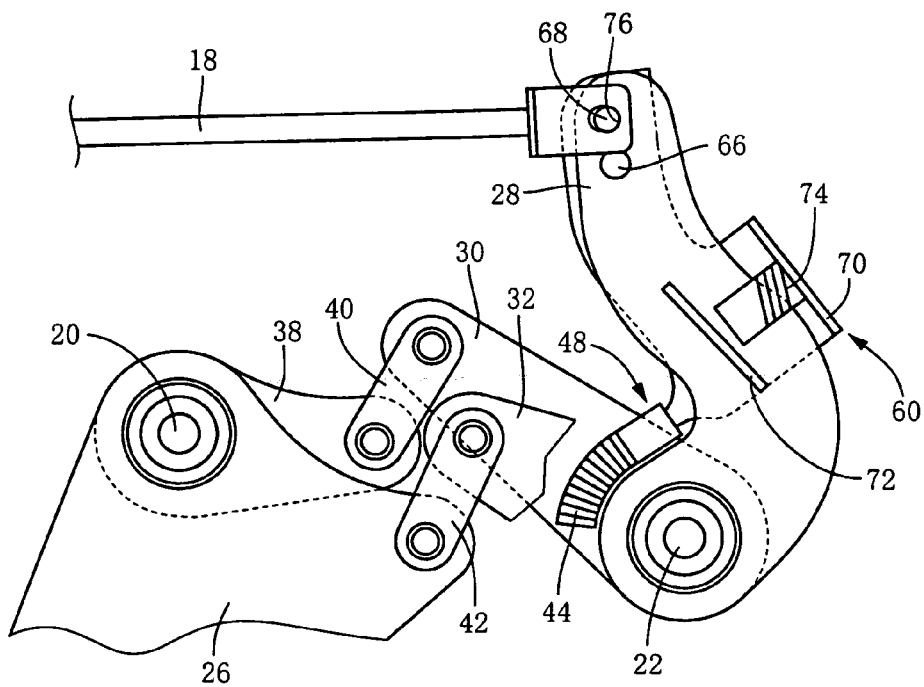
FIG. 6 is a view showing a main portion of FIG. 4B in enlargement with a part of which being cut away.

In mutually opposed side surfaces of the respective first and second working levers 30, 32, namely, in inside surfaces of the respective working levers 30, 32 located on respective opposite sides of the pivot member 28, a multiplicity of first meshing teeth 44 and a multiplicity of second meshing teeth 46 are provided to be arranged in a radial manner along a circular arc whose center is at the second axis $O_2$. The first and second meshing teeth 44, 46 are integrally connectable to the pivot member 28 via a clutch member 48 that is disposed on the pivot member 28. The first and second working levers 30, 32 are pivoted relative to each other, as shown in FIGS. 4A and 4B, due to difference between their respective lever-ratio characteristics, as a result of the depressing operation effected on the pedal arm 26. The first meshing teeth 44 and the second meshing teeth 46 are arranged in substantially the same position over a predetermined angular range of the circular arc about the second axis $O_2$, such that the first and second meshing teeth 44, 46 are connectable to the pivot member 28 via the clutch member 48 throughout the pedal stroke of the pedal arm 26 in spite that the first and second working levers 30, 32 are pivoted relative to each other. FIGS. 5 and 6 are views showing a main portion of FIG. 4A and a main portion of view FIG. 4B, respectively, namely, showing the upper end portion of the pedal arm 26, the sub arm 38, the first and second working levers 30, 32 and the pivot member 28 in enlargement, with a part of the second working lever 32 being cut away. In the present embodiment, the first and second working levers 30, 32 are arranged in substantially parallel with each other and extend substantially in the same direction.

Figure 7:
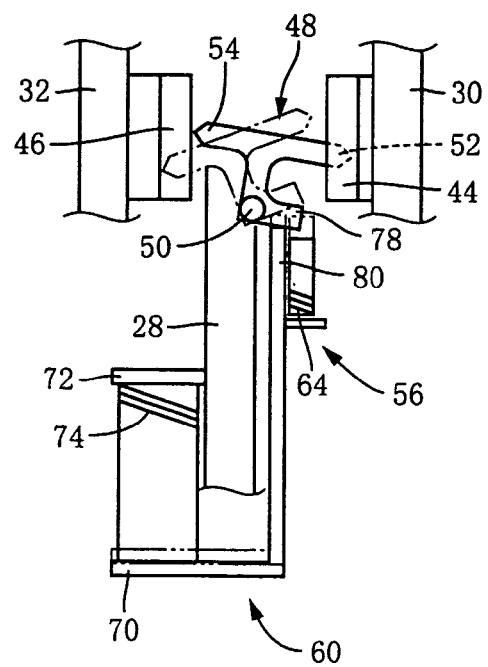
FIG. 7 is a plan view showing a clutch member, a clutch switching mechanism of the lever-ratio switching type brake pedal apparatus of FIG. 1, together with their neighborhood, wherein solid line indicates the clutch member being held in its first connecting position while two-dot chain line indicates the clutch member being held in its second connecting position.
Figure 8:
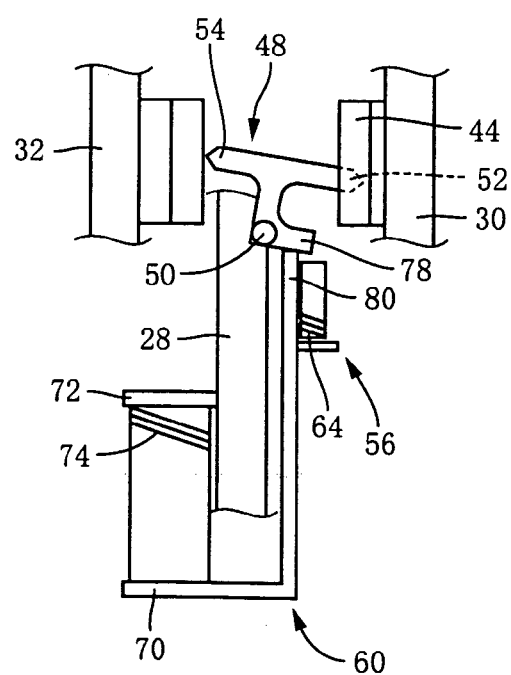
FIG. 8 is a plan view showing a state as indicated by the solid line of FIG. 7 in which the clutch member is held in the first connecting position.

FIG. 7 is a plan view principally showing the clutch member 48 and the first and second meshing teeth 44, 46. The clutch member 48 has a substantially letter T-shape, and is disposed at its vertical bar portion on the pivot member 28, pivotably about a support pin 50. The clutch member 48 has a first engaging tooth 52 and a second engaging tooth 54 that are provided in respective opposite distal ends of a horizontal bar portion of the clutch member 48. The support pin 50 is provided in the clutch member 48, with its attitude causing its axis to be substantially perpendicular to the axis $O_2$ of the second shaft 22. The clutch member 48 is disposed with its attitude causing the clutch member 48 to take the substantially letter T-shape as seen in a plane perpendicular to the axis of the support pin 50. The clutch member 48 is arranged to be mechanically pivotable by a clutch switching mechanism 56, between a first connecting position as indicated by solid line in FIG. 7 and in FIG. 8 and a second connecting position as indicated by two-dot chain line in FIG. 7 and in FIG. 9. When the clutch member 48 is positioned in the first connecting position, the first engaging tooth 52 is engaged with the first meshing teeth 44, and the second engaging tooth 54 is disengaged from the second meshing teeth 46, whereby the first working lever 30 and the pivot member 28 are integrally connected to each other so as to be integrally pivoted about the second axis $O_2$. In this state, the lever ratio is changed according to the lever-ratio characteristic 1. When the clutch member 48 is pivoted to and positioned in the second connecting position by the clutch switching mechanism 56, the second engaging tooth 54 is engaged with the second meshing teeth 46, and the first engaging tooth 52 is disengaged from the first meshing teeth 44, whereby the second working lever 32 and the pivot member 28 are integrally connected to each other so as to be integrally pivoted about the second axis $O_2$. In this state, the lever ratio varies according to the lever-ratio characteristic 2.

When the clutch member 48 is in an intermediate position between the first and second connecting positions, both of the first and second engaging teeth 52, 54 are held in engagement with the first and second meshing teeth 44, 46. Thus, the pivot member 28 is always connected to at least one of the first and second working levers 30, 32, so that the depressing force applied to the pedal arm 26 is continuously transmitted to the pivot member 28 even in a stage of transition from one of the first and second connecting positions to the other of the first and second connecting positions, i.e., in a stage of switching from the layer-ratio characteristic to another laver-ratio characteristic by the pivot motion of the clutch member 48. FIGS. 10A-10D show amounts stx, st1, st2 of the pedal stroke at which the clutch member 48 is pivoted from the first connecting position to second connecting position whereby the lever-ratio characteristic 1 is switched to the lever-ratio characteristic 2.

The clutch switching mechanism 56 is constituted principally by a tensile coil spring 64 provided to bridge the clutch member 48 and a load reaction lever 60 that is disposed on the pivot member 28, with a tension given to the coil spring 64. As is apparent from FIG. 3, the load reaction lever 60 is disposed on the pivot member 28, pivotably about an axis (third axis) of a third shaft 66 that is parallel to the axis $O_2$ of the second shaft 22. The operating rod 18 of the brake booster 14 is connected to the pivot member 28, pivotably relative to the load reaction lever 60 about an axis of a connecting pin (clevis pin) 68 that is adjacent to and parallel to the third shaft 66. The third shaft 66 may be fixed integrally to either one of the load reaction lever 60 and pivot member 28. However, the third shaft 66 may be arranged to connect the load reaction lever 60 and pivot member 28, while being pivotable relative to both of the load reaction lever 60 and pivot member 28.

As is apparent from FIG. 2, the load reaction lever 60 has a spring receiver portion 70 provided by its portion that is bent by substantially a right angle. A load adjuster spring 74 is disposed between the spring receiver portion 70 of the load reaction lever 60 and a spring receiver portion 72 that is integrally fixed to the pivot member 28. This load adjuster spring 74 is a spring member corresponding to a first biaser. In the present embodiment, the load adjuster spring 74 is provided by a compression spring, and is disposed with its attitude substantially parallel to a line tangential to a circular arc whose center is at the third shaft 66 so that a biasing force of the load adjuster spring 74 acts in a direction substantially parallel to the tangential line. Thus, the load reaction lever 60 is biased to be pivoted relative to the pivot member 28 about the third shaft 66 counterclockwise as seen in FIG. 1. The connecting pin 68 passes though an elongated hole 76 that is formed through the pivot member 28. That is, the pivot member 28 and the load reaction lever 60 are pivotable about the third shaft 66 relative to each other within a range that is defined by engagement of the elongated hole 76 and the connecting pin 68. The elongated hole 76 is elongated in a direction in which the circular arc (whose center corresponds to the axis of the third shaft 66) extends.

Therefore, the load reaction lever 60 is held by the biasing force of the load adjuster spring 74, in its reference position that corresponds to an end of a counterclockwise pivot motion of the lever 60 about the axis of the third shaft 66, as shown in FIG. 4A and FIG. 5. In this instance, the clutch member 48 is held by the biasing force of the tensile coil spring 64, in the fist connecting position, as shown in solid line of FIG. 7 and in FIG. 8, whereby the first working lever 30 and the pivot member 28 are integrally connected to each other through the clutch member 48. The clutch member 48 has an engaged portion 78 that is provided in an end portion of the vertical bar portion of the letter T shape. The tensile coil spring 64 is engaged with the engaged portion 78 so that the clutch member 48 is biased in clockwise direction about the support pin 50. Meanwhile, a positioning protrusion 80 provided in the load reaction lever 60 is held in contact with the engaged portion 78 of the clutch member 48. Owing to the tensile coil spring 64 and the positioning protrusion 80, the attitude of the clutch member 48 is kept constant whereby the engagement of the first engaging tooth 52 with the first meshing teeth 44 is maintained. The tensile coil spring 64 is a spring member corresponding to a second biaser.

In a state in which the clutch member 48 is positioned in the first connecting position with the load reaction lever 60 being held in the reference position as described above, when the pedal arm 26 is operatively depressed, the depressing force transmitted to the first working lever 30 via the sub arm 38 and the first connecting links 40 is further transmitted to the pivot member 28 via the first meshing teeth 44 and the first engaging tooth 52, and is still further transmitted to the operating rod 18 of the brake booster 14 via the load reaction lever 60. In this state, the lever ratio varies according to the lever-ratio characteristic 1. As a result of transmission of the depressing force to the operating rod 18, the operating rod 18 is mechanically pressed leftward as seen in FIG. 1, whereby a push rod of a master cylinder (not shown) is pressed for generating a brake hydraulic pressure. The brake booster 14 functions as a boosting device that is arranged to boost a small depressing force, for example, by a vacuum pressure, so as to generate a large braking force. The operating rod 18 is biased to project outwardly from the brake booster 14. When the depressing operation effected on the pedal arm 26 is suspended, the load reaction lever 60 and the pivot member 28 are integrally returned by the biasing force to be pivoted clockwise about the second shaft 22, and the pedal arm 26 is returned to be pivoted counterclockwise about the first shaft 20 whereby the pedal arm 26 is held in its home position as shown in FIG. 1. The operating rod 18 corresponds to an output member.

However, when the depressing force applied to the pedal arm 26 is increased and accordingly a reaction force exerted from the operating rod 18 and acting on the connecting pin 68 exceeds a predetermined switching load, the load reaction lever 60 is pivoted by the reaction force against the biasing force of the load adjuster spring 74, relative to the pivot member 28 clockwise about the third shaft 66 as seen in FIG. 5. That is, while the pivot member 28 is pivoted counterclockwise about the axis $O_2$ of the second shaft 22 as a result of increase in the pedal stroke, the upper end portion of the load reaction lever 60, i.e., the connecting pin 68 (serving as a connected portion at which the load reaction lever 60 is connected to the operating rod 18) is relatively moved within the elongated hole 76 by the reaction force of the operating rod 18, so that the load reaction lever 60 is pivoted relative to the pivot member 28 to its switching position, as shown in FIG. 4B and FIG. 6, in which the connecting pin 68 is brought into contact with another end portion of the elongated hole 76. After the load reaction lever 60 has been thus pivoted relative to the pivot member 28 to the switching position, the load reaction lever 60 restarts being pivoted integrally with the pivot member 28 about the axis $O_2$ of the second shaft 22. The switching load causing the load reaction lever 60 to be relatively pivoted to the switching position is determined univocally based on a preload (initial elastic deformation amount) of the load adjuster spring 74. The switching load can be adjusted by expanding and contracting the load adjuster spring 74. The expansion and contraction of the spring 74 can be made, for example, by advancing and reversing a spring receiver member (not shown) provided in the spring receiver portion 70 or 72, by means of a threaded screw or the like.

Figure 9:
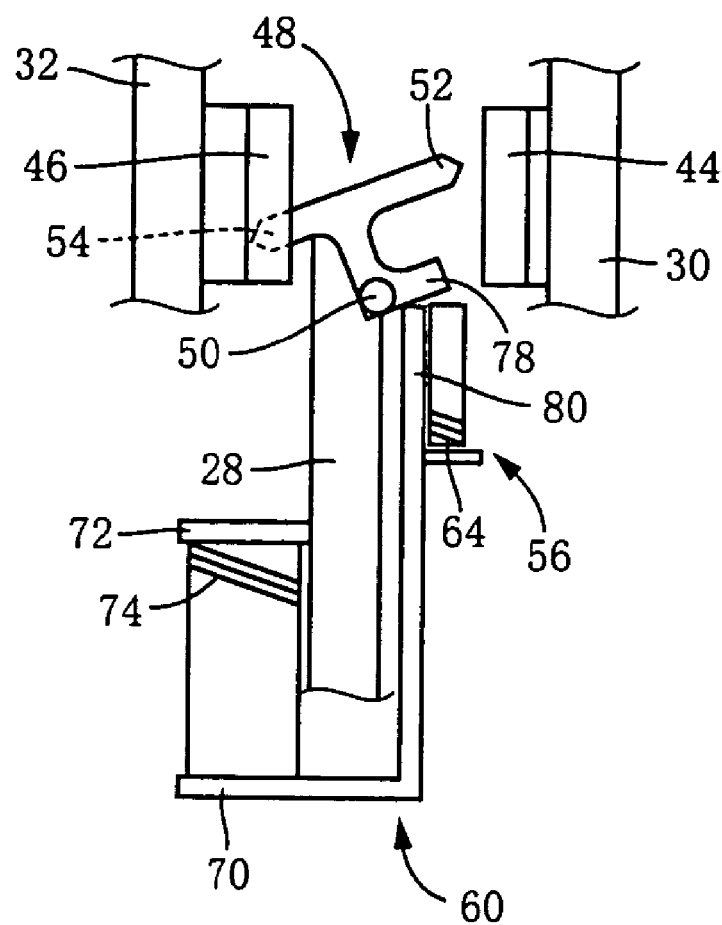
FIG. 9 is a plan view showing a state as indicated by the two-dot chain line of FIG. 7 in which the clutch member is held in the second connecting position.

When the load reaction lever 60 is pivoted to the switching position relative to the pivot member 28, the clutch member 48 is pivoted counterclockwise about the support pin 50 by engagement of the engaging portion 78 with the positioning protrusion 80 of the load reaction lever 60 against the biasing force of the tensile coil spring 64, whereby the clutch member 48 is positioned in the second connecting position as indicated by two-dot chain line in FIG. 7 and in FIG. 9. The clutch member 48 is held in the second connection position with its attitude being constant and determined based on the switching position of the load reaction lever 60, so that engagement of the second engaging tooth 54 with the second meshing teeth 46 is maintained whereby the second working lever 32 and the pivot member 28 are integrally connected to each other. In this state, therefore, when the pedal arm 26 is further operatively depressed, the depressing force transmitted to the second working lever 32 via the second connecting links 42 is further transmitted to the pivot member 28 via the second meshing teeth 46 and the second engaging tooth 54, and is still further transmitted to the operating rod 18 of the brake booster 14 via the connecting pin 68 provided in the load reaction lever 60. In this state, the lever ratio varies according to the lever-ratio characteristic 2.

When the depressing force applied to the pedal arm 26 is reduced, the load reaction lever 60 is pivoted to be returned to the reference position by the biasing force of the load adjuster spring 74, and the clutch member 48 is pivoted to be returned to the first connecting position by the returning pivot motion of the load reaction lever 60 and the biasing force of the tensile coil spring 64. When application of the depressing force to the pedal arm 26 is completely released, the load reaction lever 60 and the pivot member 28 are integrally returned by the biasing force of the operating rod 18 to be pivoted clockwise about the second shaft 22, and the pedal arm 26 is returned to be pivoted counterclockwise about the first shaft 20 whereby the pedal arm 26 is held in its home position as shown in FIG. 1.

Figure 10:
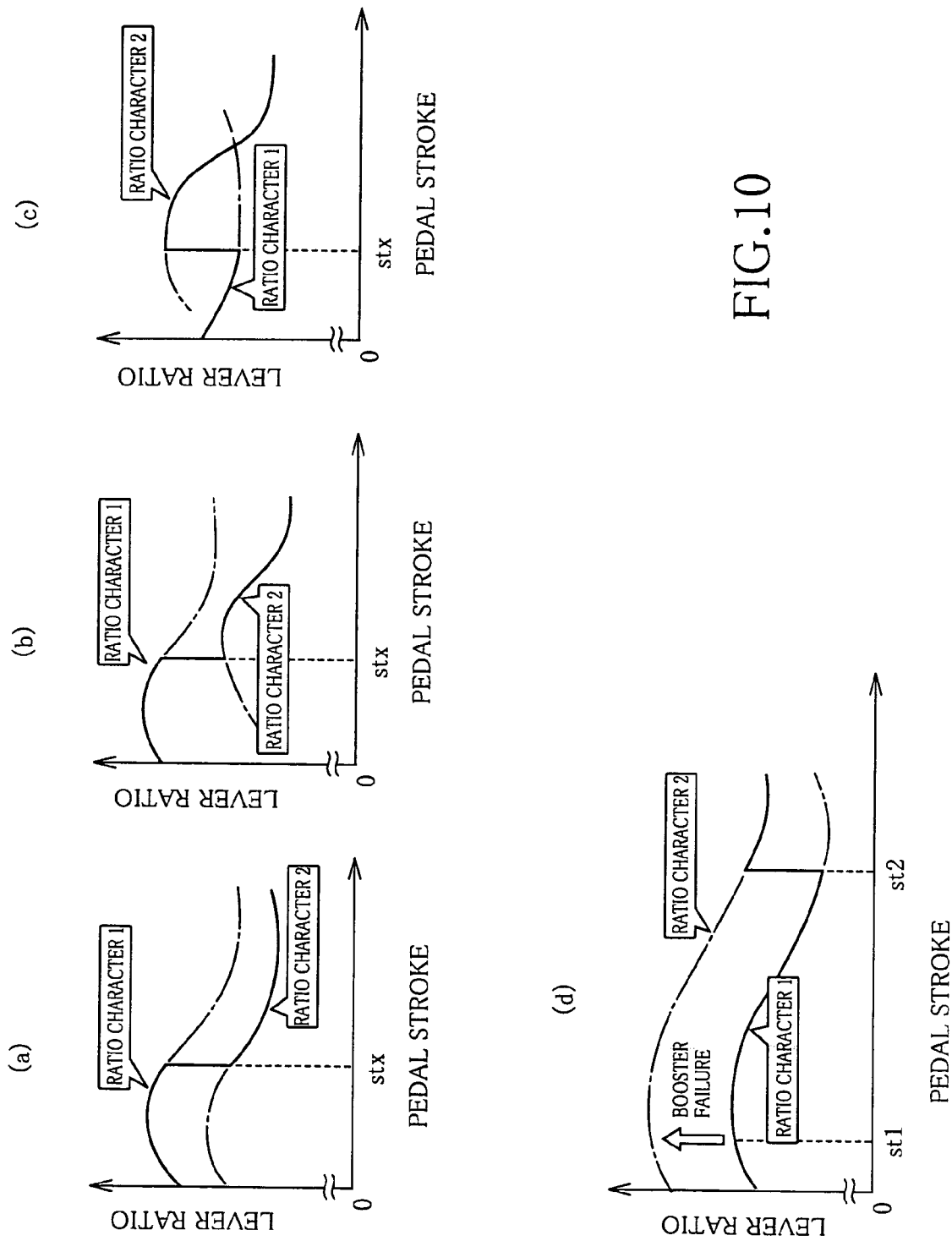
FIGS. 10A-10D are views showing some examples of lever-ratio characteristics provided by the lever-ratio switching type brake pedal apparatus of the present invention.

When the load reaction lever 60 is relatively pivoted from the reference position to the switching position as a result of excess of the reaction force (corresponding to the depressing force) of the operating rod 18 over the switching load, a path of transmission of the depressing force is switched by the clutch switching mechanism 56, from the first working lever 30 to the second working lever 32, whereby the selected lever-ratio characteristic is switched from the lever-ratio characteristic 1 to the lever-ratio characteristic 2. In FIG. 10A-10D, the amounts stx, st1, st2 of the pedal stroke at which the lever-ratio characteristic 1 is switched to the lever-ratio characteristic 2 are determined depending on the switching load causing the load reaction lever 60 to be displaced to the switching position. In other words, the switching load, i.e., the preload of the load adjuster spring 74 may be set such that the selected lever-ratio characteristic is switched at the predetermined amounts stx, st1, st2 of the pedal stroke. Each of FIG. 10A-10C shows an arrangement where the lever-ratio characteristic 1 is switched to the lever-ratio characteristic 2 upon excess of the pedal stroke over the amount stx during an ordinary braking operation. In the arrangement shown in each of FIGS. 10A and 10B, the lever ratio is smaller while the pedal stroke exceeds the amount stx, namely, while the pedal arm 26 is being strongly depressed. Thus, a ratio of amplification of the braking force to the depressing force is reduced whereby a change in the braking force becomes smaller, thereby facilitating a fine manipulation of the braking force. In the arrangement shown in FIG. 10C, the lever ratio is larger while the pedal stroke exceeds the amount stx, namely, while the pedal arm 26 is being strongly depressed. Thus, the ratio of amplification of the braking force to the depressing force is increased thereby facilitating generation of a large braking force.

On the other hand, FIG. 10D shows an arrangement where the lever-ratio characteristic 1 is switched to the lever-ratio characteristic 2 with application of a large load (large depressing force) that is rarely applied in an ordinary braking operation. When the pedal stroke reaches the amount st2 as a result of large (strong) depression of the pedal arm 26, for example, in case of an abrupt brake or running on a downhill, the reaction force is increased to the switching load, and the selected lever-ratio characteristic is switched to the lever-ratio characteristic 2, whereby the lever ratio is increased and the braking force is further increased. Further, the amount st1 of the pedal stroke is an amount at which the selected lever-ratio characteristic is switched to the lever-ratio characteristic 2 as a result of increase of the reaction force to the switching load in a case where a large depressing force is required even in an initial stage, for example, in the event of failure of the brake booster 14. With selection of the lever-ratio characteristic 2 whose lever ratio is high, the rate of amplification is increased whereby generation of a large braking force is facilitated. In the arrangement of FIG. 10C, too, in a case where a large depressing force is required even in an initial stage of the depressing operation, for example, in the event of failure of the brake booster 14, the selected lever-ratio characteristic is switched to the lever-ratio characteristic 2 in a stage earlier than the amount stx, so that the rate of amplification is increased whereby a large braking force is generated.

In the brake pedal apparatus 10 of the present embodiment, as describe above, in response to the depressing operation effected on the pedal arm 26, the first and second working levers 30, 32 can be pivoted about the axis $O_2$ of the second shaft 22 according to the respective different lever-ratio characteristics, and can be connected integrally to the pivot member 28 through the clutch member 48. One of the lever-ratio characteristics 1, 2 is selected depending on which one of the first and second working levers 30, 32 is connected to the pivot member 28. While the pedal arm 26 is being moderately depressed, namely, while the reaction force of the operating rod 18 is not larger than the switching load, the load reaction lever 60 is held in the reference position by the biasing force of the load adjuster spring 74 (see FIG. 5), so that the clutch member 48 is positioned in the first connecting position through the clutch switching mechanism 56 (see FIG. 8) whereby the first working lever 30 is connected to the pivot member 28. On the other hand, while the pedal arm 26 is being strongly depressed, namely, while the reaction force of the operating rod 18 exceeds the switching load, the load reaction lever 60 is pivoted to the switching position against the biasing force of the load adjuster spring 74 (see FIG. 6), so that the clutch member 48 is placed in the second connecting position (see FIG. 9) whereby the second working lever 32 is connected to the pivot member 28. That is, depending upon whether the pedal arm 26 is depressed strongly or moderately, namely, whether the reaction force exceeds the switching load or not, a path of transmission of the depressing force is changed by the clutch switching mechanism 56 whereby the selected lever-ratio characteristic is changed. For example, where the lever ratio of the lever-ratio characteristic 2 for the strong depression is set to be higher than the lever ratio of the lever-ratio characteristic 1 for the moderate depression, as in the arrangements of FIGS. 10C and 10D, the ratio of amplification of the braking force to the depressing force during the strong depression is increased whereby a large braking force can be easily generated. On the other hand, where the lever ratio of the lever-ratio characteristic 2 for the strong depression is set to be lower than the lever ratio of the lever-ratio characteristic 1 for the moderate depression, as in the arrangements of FIGS. 10A and 10B, the ratio of amplification of the braking force to the depressing force during the strong depression is reduced whereby a fine manipulation of the braking force is facilitated.

In the present embodiment, since the pedal arm 26 functioning as the operating pedal is supported by the pedal bracket 16 such that the pedal arm 26 is pivotable about a predetermined fixed axis in the form of the axis O1 of the first shaft 20, it is possible to restrain variation of the home position of the pedal arm 26 and play of the pedal arm 26 which could be caused by errors in dimensions and position of each component of the apparatus 10, as compared with the arrangement disclosed in the above-described Patent Document 2 in which the center of pivot motion of the operating pedal is changed. This feature alleviates the required degrees of dimensional accuracy and assembling accuracy of the components, thereby making it possible to easily and cheaply manufacture the brake pedal apparatus 10 having a predetermined pedal quality.

Further, since the first and second working levers 30, 32 are connected to the sub arm 38 and the pedal arm 26, respectively, through the respective first and second connecting links 40, 42, the degree of freedom in setting the lever-ratio characteristics of the respective first and second working levers 30, 32 is high. Thus, as compared with the arrangement in which the lever-ratio characteristic is changed by merely changing the center of the pivot motion of the operating pedal, it is possible to provide a lever ratio that is further suitably variable according to the depressing force applied to the operating pedal. That is, by suitably designing projection directions and lengths of the first and second working levers 30, 32 and sub arm 38 and also connected positions of opposite end portions of the first and second connecting links 40, 42, each of the lever-ratio characteristics of the respective first and second working levers 30, 32, i.e., each of the lever-ratio characteristics 1, 2 for the moderate depression and strong depression can be freely set within a wide range.

Further, since the first and second working levers 30, 32 are disposed to be pivotable about the axis $O_2$ of the second shaft 22 that is common to the two working levers 30, 32, the brake pedal apparatus 10 can be made compact in size, so that there is an advantage that the apparatus 10 can be easily installed on a vehicle. Especially, in the present embodiment in which the first and second working levers 30, 32 are arranged in substantially parallel with each other and extend substantially in the same direction, the first and second meshing teeth 44, 46 can be provided in proximal end portions of the respective first and second working levers 30, 32, and each of the first and second working levers 30, 32 can be made compact in size.

Further, the first working lever 30 has the multiplicity of first meshing teeth 44 arranged along the circular arc whose center is at the axis $O_2$ of the second shaft 22, while the second working lever 32 has the multiplicity of second meshing teeth 46 arranged along the circular arc whose center is at the axis $O_2$ of the second shaft 22. When the clutch member 48 which is pivotably disposed on the pivot member 28 is positioned in the first connecting position by the biasing force of the tensile coil spring 64, the first engaging tooth 52 of the clutch member 48 is engaged with the first meshing teeth 44, whereby the first working lever 30 and the pivot member 28 are integrally connected to each other. When the load reaction lever 60 is pivoted to the switching position, the clutch member 48 is pivoted to the second connecting position by engagement of the load reaction lever 60 with the clutch member 48 against the biasing force of the tensile coil spring 64, the second engaging tooth 54 is engaged with the second meshing teeth 46, so that the second working lever 32 and the pivot member 28 are integrally connected to each other whereby the lever-ratio characteristic 1 is switched to the lever-ratio characteristic 2. Therefore, as compared with an arrangement in which the clutch member 48 is arranged to be movable linearly along a straight line parallel to the second axis $O_2$ so as to be positionable in the first and second connecting positions, the apparatus can be simply constructed, and the motion of the clutch member 48 is stabilized, so that the lever-ratio characteristic is reliably switched to another layer-ratio characteristic, upon application of a predetermined depressing force to the operating pedal.

Further, the load adjuster spring 74 is used as the first biaser which positions the load reaction lever 60 in the reference position and which allows the load reaction lever 60 to be relatively pivoted to the switching position when the reaction force exceeds the predetermined switching load. The load adjuster spring 74 is arranged to directly bias the load reaction lever 60 such that the load reaction lever 60 is pivoted about the axis of the third shaft 66 toward the reference position relative to the pivot member 28. In this arrangement, the load reaction lever 60 is moved to the switching position appropriately based on the switching load that is determined univocally depending on the biasing force of the load adjuster spring 74, so that the selected lever-ratio characteristic can be reliably switched from the lever-ratio characteristic 1 to the lever-ratio characteristic 2 with high accuracy. In the above-described Patent Document 2 in which the positioning device is provided to position the switching lever in the reference position by engagement of a ball with a V-shaped groove, the switching lever is held in the reference position owing to friction force acting between the ball and a wall of the V-shaped groove. In this arrangement of the Patent Document 2, the switching load (allowing pivot movement of the switching lever by removal of the ball from the V-shaped groove) is easily changed, for example, by wear of the wall of the V-shaped groove, so that the switching load is difficult to be set reliably with high accuracy. On the other hand, in the present embodiment, the load adjuster spring 74 is engaged directly with the pivot member 28 and the load reaction lever 60, with its attitude being substantially parallel to a line tangential to a circular arc whose center is at the third shaft 66 so that a biasing force of the load adjuster spring 74 acts directly in a direction causing the load reaction lever 60 to be pivoted to the reference position. Thus, the switching load causing the load reaction lever 60 to be moved from the reference position to the switching position can be set by the preload of the load adjuster spring 74 with high accuracy.

Figure 11:
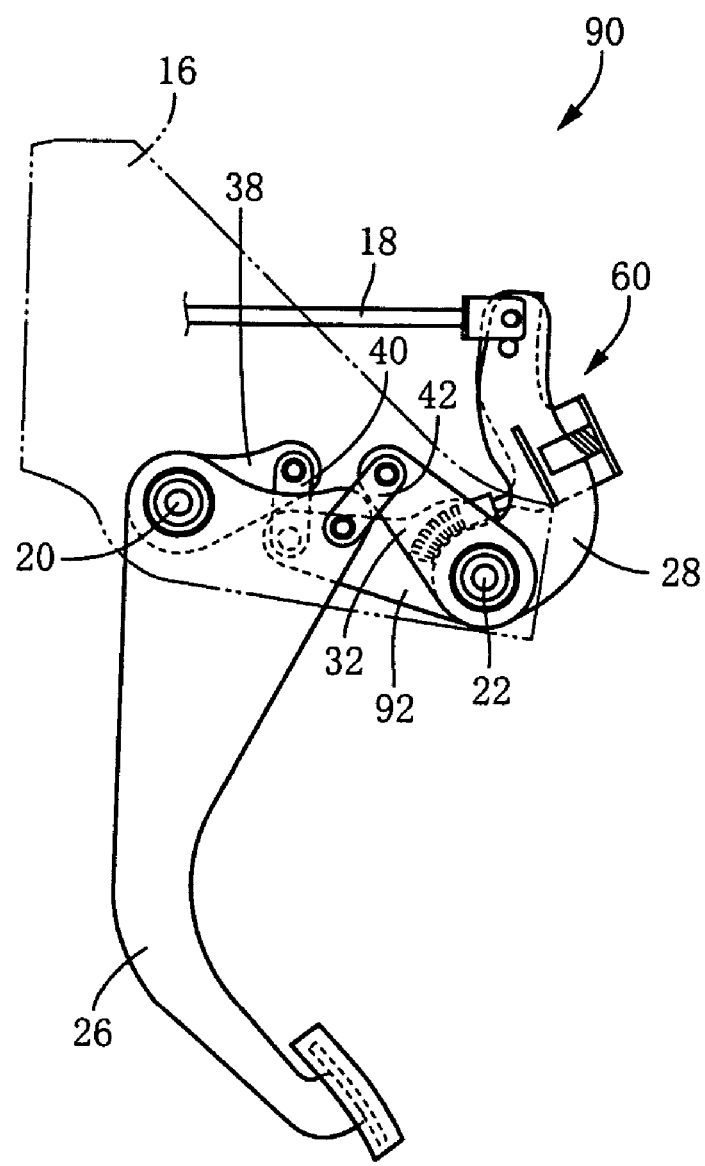
FIG. 11 is a side view for explaining another embodiment of the present invention.

In the above-described embodiment, the first and second working levers 30, 32 are pulled downward through the respective first and second connecting links 40, 42 in response to the depressing operation effected on the pedal arm 26, and are pivoted counterclockwise about the axis O₂ of the second shaft 22. However, this arrangement can be modified such that the first and second working levers 30, 32 are to be pressed so as to be pivoted. For example, a brake pedal apparatus 90 of FIG. 11 is identical with the above-described brake pedal apparatus 10 with respect to arrangement for the connection of the second working lever 32 with the second connecting links 42. However, a first working lever 92 is disposed to be directed more forward than the above-described first working lever 30, and is connected to the sub arm 38 via the first connecting links 40 in a position below the sub arm 38. In this modified arrangement, in response to the depressing operation effected on the pedal arm 26, the first working lever 92 is pressed downward through the first connecting links 40, and is pivoted counterclockwise about the axis O₂ of the second shaft 22. It is noted that the first meshing teeth 44 that are to be engaged with the first engaging tooth 52 of the clutch member 48 are provided in a portion of the first working lever 92 (ranging from an upper left side to an upper side of the second shaft 22 as seen in FIG. 11) that corresponds to a portion of the first working lever 30 in which the first meshing teeth 44 are provided.

The embodiments of the present invention have been described in detail with reference to the drawings. However, the described embodiments are merely embodied forms, and the present invention can be embodied with various modifications and improvements on the basis of knowledge of those skilled in the art.

The invention claimed is:

1. A brake pedal apparatus for a vehicle, comprising:
   an operating pedal supported by a support member pivotably about a first axis, to be depressed by an operator of the vehicle;
   a pivot member supported by the support member pivotably about a second axis parallel to the first axis, mechanically connected to the operating pedal and pivotable about the second axis when the operating pedal is depressed to be pivoted about the first axis;
   an output member for receiving an output generated upon pivotal motion of the pivot member;
   first and second working levers supported by the support member pivotably about the second axis relative to the pivot member;
   first and second connecting devices mechanically connecting the respective first and second working levers to the operating pedal, and causing the respective first and second working levers to be pivoted according to respective different lever-ratio characteristics when the operating pedal is depressed to be pivoted;
   a clutch member supported by the pivot member, and positionable in any one of a first connecting position, a second connecting position and an intermediate position between the first and second connecting positions, the clutch member connecting the first working lever to the pivot member and disconnecting the second working lever from the pivot member while positioned in the first connecting position, the clutch member connecting the second working lever to the pivot member and disconnecting the first working lever from the pivot member while positioned in the second connecting position, the clutch member connecting both of the first and second working levers to the pivot member being positioned in the intermediate connecting position;
   a load reaction lever connected to the output member, and supported by the pivot member pivotably relative to the pivot member about a third axis that is parallel to the second axis, the load reaction lever held in a reference position by a biasing force of a first biaser and pivoted together with the pivot member so as to generate the output received by the output member, the load reaction lever being pivotable to a switching position against the biasing force of the first biaser when a reaction force of the output member exceeds a predetermined switching load, and the load reaction lever positioned in the switching position being pivotable together with the pivot member so as to generate the output; and
   a clutch switching mechanism which positions the clutch member in the first connecting position while the load reaction lever is held in the reference position, and which cooperates with the load reaction lever to move and position the clutch member in the second connecting position when the load reaction lever is pivoted to the switching position.

2. The brake pedal apparatus according to claim 1, wherein the output member receives one of a pressing force and a tensile force as the output is generated upon the pivot motion of the pivot member.

3. The brake pedal apparatus according to claim 1,
   wherein the first and second working levers are disposed on respective opposite sides of the pivot member in a direction parallel to the second axis, the first working lever having a multiplicity of first meshing teeth arranged along a circular arc whose center is at the second axis, the second working lever having a multiplicity of second meshing teeth arranged along a circular arc whose center is at the second axis,
   wherein the clutch member is pivotably supported by the pivot member and has a first engaging tooth engageable with the first meshing teeth, and a second engaging tooth engageable with the second meshing teeth,
   wherein the clutch switching mechanism has a second biaser disposed to bridge between the clutch member and one of the load reaction lever and the pivot member,
   wherein the clutch switching mechanism causes the clutch member to be positioned in the first connecting position by a biasing force of the second biaser, and causes the first engaging tooth to be engaged with one of the first meshing teeth while the load reaction lever is held in the reference position,
   and wherein the clutch switching mechanism causes the clutch member to be pivoted to the second connecting position by engagement of the load reaction lever with the clutch member against the biasing force of the second biaser, and causes the second engaging tooth to be engaged with one of the second meshing teeth when the load reaction lever is pivoted to the switching position.

4. The brake pedal apparatus according to claim 1,
   wherein the first connecting device includes a first connecting link which is pivotably connected to both of the first working lever and the operating pedal,
   and wherein the second connecting device includes a second connecting link pivotably connected to both of the second working lever and the operating pedal.

5. The brake pedal apparatus according to claim 4,
   wherein the first connecting link has a working-lever side portion at which the first connecting link is connected to the first working lever, and a pedal side portion at which the first connecting link is connected to the operating pedal,
   wherein the second connecting link has a working-lever side portion at which the second connecting link is connected to the second working lever, and a pedal side portion at which the second connecting link is connected to the operating pedal, wherein a distance between the working-lever side portion of the first connecting link and the second axis is different from a distance between the working-lever side portion of the second connecting link and the second axis, and wherein a distance between the pedal side portion of the first connecting link and the first axis is different from a distance between the pedal side portion of the second connecting link and the first axis.

6. The brake pedal apparatus according to claim 1, wherein the first biaser includes a spring member disposed to bridge between the pivot member and the load reaction lever, and which directly biases the load reaction lever such that the load reaction lever is pivoted toward the reference position.

7. The brake pedal apparatus according to claim 1, wherein the first and second working levers pivot relative to each other when the operating pedal is depressed to be pivoted.

* * * * *